United States Patent
Parry et al.

(10) Patent No.: US 12,430,132 B2
(45) Date of Patent: Sep. 30, 2025

(54) TECHNOLOGIES FOR INTERCONNECT ADDRESS REMAPPER WITH EVENT RECOGNITION AND REGISTER MANAGEMENT

(71) Applicant: SiFive, Inc., San Mateo, CA (US)

(72) Inventors: David Parry, Cupertino, CA (US); Drew Barbier, Austin, TX (US); Josh Smith, San Francisco, CA (US); Alexandre Solomatnikov, San Carlos, CA (US); Krste Asanovic, Oakland, CA (US)

(73) Assignee: SiFive, Inc., Santa Clara, CA (US)

( * ) Notice: Subject to any disclaimer, the term of this patent is extended or adjusted under 35 U.S.C. 154(b) by 0 days.

(21) Appl. No.: 18/282,728

(22) PCT Filed: Mar. 28, 2022

(86) PCT No.: PCT/US2022/022095
§ 371 (c)(1),
(2) Date: Sep. 18, 2023

(87) PCT Pub. No.: WO2022/212232
PCT Pub. Date: Oct. 6, 2022

(65) Prior Publication Data
US 2024/0160449 A1    May 16, 2024

Related U.S. Application Data

(60) Provisional application No. 63/167,509, filed on Mar. 29, 2021.

(51) Int. Cl.
*G06F 9/32* (2018.01)
*G06F 13/32* (2006.01)

(52) U.S. Cl.
CPC .............. *G06F 9/327* (2013.01); *G06F 13/32* (2013.01)

(58) Field of Classification Search
CPC ..... G06F 2213/2418; G06F 2213/2424; G06F 2213/2414; G06F 2213/13001; G06F 13/32; G06F 13/404; G06F 9/327
See application file for complete search history.

(56) References Cited

U.S. PATENT DOCUMENTS

| 5,764,999 A | 6/1998 | Wilcox et al. |
| 6,425,039 B2 * | 7/2002 | Yoshioka ............ G06F 9/30101 712/E9.024 |

(Continued)

FOREIGN PATENT DOCUMENTS

| CN | 107729055 B | 8/2020 | |
| EP | 3361391 B1 * | 1/2021 | ............... G06F 1/10 |

*Primary Examiner* — Raymond N Phan
(74) *Attorney, Agent, or Firm* — Kilpatrick Townsend & Stockton LLP

(57) ABSTRACT

Systems and methods are disclosed for a configurable interconnect address remapper with event detection. For example, an integrated circuit can include a processor core configured to execute instructions. The processor core includes region registers defined by a From Address range and a To Address, a register storing a number of regions defined in the integrated circuit, interrupt enable registers associated with each pair of region registers, and event flags associated with each pair of region registers; an interconnection system handling transactions from the processor core; an interconnect address remapper translating an address associated with a transaction using the one or more pair of region registers; and an interrupt controller receiving an interrupt signal from the interconnect address remapper when the interrupt enable registers are enabled and at least one raised event flags when at least one of the one or more pair of region registers matches the transaction address.

20 Claims, 5 Drawing Sheets

(56) References Cited

U.S. PATENT DOCUMENTS

| | | | |
|---|---|---|---|
| 8,417,914 B2* | 4/2013 | Manning | G06F 12/0246 |
| | | | 711/170 |
| 2007/0168689 A1* | 7/2007 | Blacquiere | G11B 20/1883 |
| 2009/0106771 A1* | 4/2009 | Benner | G06F 12/1466 |
| | | | 719/313 |
| 2019/0018813 A1 | 1/2019 | Das Sharma | |
| 2020/0167291 A1* | 5/2020 | Asaro | G06F 12/1009 |
| 2021/0132999 A1* | 5/2021 | Haywood | G06F 9/544 |
| 2021/0157601 A1* | 5/2021 | Craske | G06F 9/4812 |

\* cited by examiner

TECHNOLOGIES FOR INTERCONNECT ADDRESS REMAPPER WITH EVENT RECOGNITION AND REGISTER MANAGEMENT

CROSS-REFERENCE TO RELATED APPLICATION(S)

This application is a national stage entry of International Patent Application Serial No. PCT/US2022/022095, filed Mar. 28, 2022, which claims priority to U.S. Provisional Application Ser. No. 63/167,509, filed Mar. 29, 2021, the entire disclosures of which are incorporated herein.

TECHNICAL FIELD

This disclosure relates to an address remapper.

BACKGROUND

A computer may have a central processing unit (CPU) or processor core comprising electronic circuitry for executing instructions. The instructions are stored in memory. The electronic circuitry may implement, for example, dispatch units, execution units, memory controllers, caches, registers, and/or other logic associated with instruction flow, such as prefetchers, branch predictors, and the like. The processor core may be used to implement arithmetic, logic, controlling, and/or input/output (I/O) operations specified by the instructions. The instructions and/or electronic circuitry may need to be changed, modified, jumped around, and/or patched based on operational and/or functional configurations.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Disclosed herein are systems and methods for implementing an interconnect address remapper with event recognition. The interconnect address remapper enables dynamic translation of addresses from one location to another. The interconnect address remapper allows transactions on the interconnect which have a From Address to be translated to a To Address when the From Address matches one of multiple translation regions. The interconnect address remapper supports read only memory (ROM) patching, instruction fetches, data loads, and/or data stores.

In some implementations, the interconnect address remapper includes interrupt signaling. Each of the multiple translation regions can include a read interrupt enable register, a write interrupt enable register, a read flag, a write flag, and/or combinations thereof. If a match occurs for a From [ ] Address, and appropriate interrupt enables are enabled, then the applicable read flag, write flag, and/or combinations thereof are set to capture the event, generate an interrupt signal, and send the interrupt signal to an interrupt controller.

In some implementations, the interconnect address remapper includes a monitor interface. A matching From Address will appear on the monitor interface when the appropriate interrupt enable registers are set or enabled. The monitor interface provides a translation region match signal and an indication of the matching translation region.

In some implementations, the interconnect address remapper with the interrupt signaling, the monitor interface, and/or combinations thereof can be used for debugging, feature control, patch execution, development, and/or other operational and functional activities.

In some implementations, the interconnect address remapper is configurable to optimize register and electronic circuitry usage. For example, the number of valid regions can be variably set depending on usage.

Implementations described herein may provide advantages over conventional processor architectures, such as, for example, providing operational and functional configuration and/or reconfiguration and facilitating non-intrusive detection of interconnect address remapper matching events. These and other aspects of the present disclosure are disclosed in the following detailed description, the appended claims, and the accompanying figures.

As used herein, the term "circuitry" refers to an arrangement of electronic components (e.g., transistors, resistors, capacitors, and/or inductors) that is structured to implement one or more functions. For example, a circuit may include one or more transistors interconnected to form logic gates that collectively implement a logical function.

Figure 1:
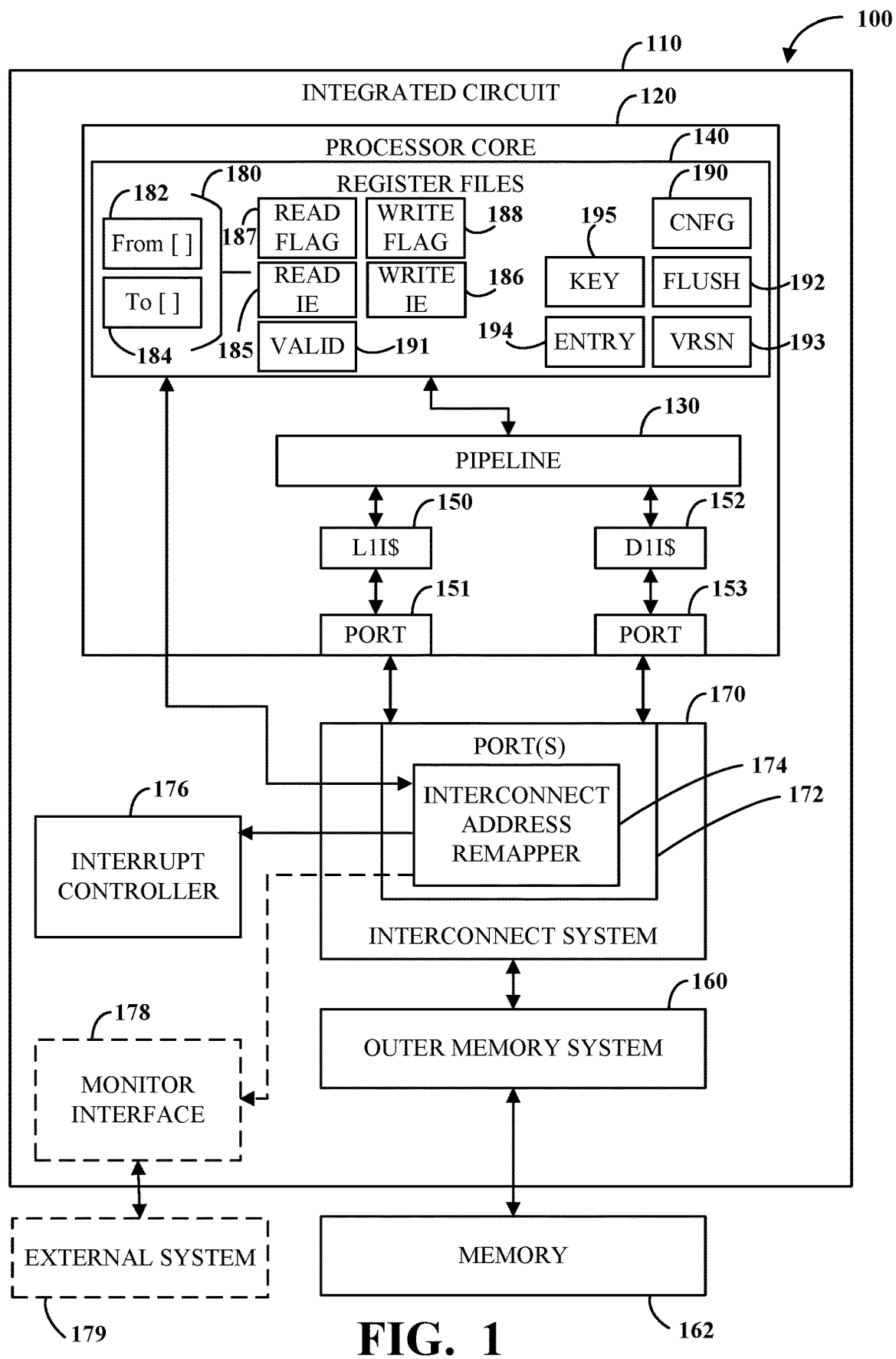
FIG. 1 is block diagram of an example of a system with a configurable interconnect address remapper with event detection.

FIG. 1 is block diagram of an example of a system 100 for implementing an interconnection address remapper with event recognition. The system 100 includes an integrated circuit 110 (e.g., a processor or microcontroller) for executing instructions. The integrated circuit 110 includes a processor core 120 including a processor pipeline 130 configured to execute instructions. The processor core 120 includes one or more register files 140. The processor core 120 includes an L1 instruction cache 150 and an L1 data cache 152. The integrated circuit 110 includes an outer memory system 160, which may include memory storing instructions and data and/or provide access to a memory 162 external to the integrated circuit 110 that stores instructions and/or data. The integrated circuit 110 includes an interconnect system 170 that enables communication between the processor core 120 and various other components of the integrated circuit 110, including the outer memory system 160.

In some implementations, the processor pipeline 130 may include one or more fetch stages that are configured to retrieve instructions from a memory system of the integrated circuit 110. For example, the processor pipeline 130 may fetch instructions via the L1 instruction cache 150. The processor pipeline 130 may include additional stages, such as decode, rename, dispatch, issue, execute, memory access, and write-back stages. For example, the processor pipeline 130 may be configured to execute instructions of a RISC V instruction set.

In some implementations, the L1 instruction cache 150 may be a set-associative cache for instruction memory. To avoid the long latency of reading a tag array and a data array in series, and the high power of reading the arrays in parallel, a way predictor may be used. The way predictor may be accessed in an early fetch stage and the hit way may be encoded into the read index of the data array. The tag array may be accessed in later fetch stage and is only used for verifying the way predictor.

In some implementations, the L1 data cache 152 may be a set-associative VIPT cache, meaning that it is indexed purely with virtual address bits VA[set] and tagged fully with all translate physical address bits PA[msb:12]. For low power consumption, the tag and data arrays may be looked up in serial so that at most a single data SRAM way is accessed. For example, the line size of the L1 data cache 152 may be 64 Bytes, and the beat size may be 16 Bytes.

In some implementations, the outer memory system 160 may include an L2 cache, which may be configured to implement a cache coherency protocol/policy to maintain cache coherency across multiple L1 caches. Although not shown in FIG. 1, the integrated circuit 110 may include multiple processor cores in some implementations. For example, the outer memory system 160 may include multiple layers.

In some implementations, the interconnect system 170 can be a chip-scale interconnect such as TileLink. TileLink is a chip-scale interconnect standard providing multiple masters with incoherent or coherent memory mapped access to memory and other slave devices. TileLink can connect cores, clusters, general-purpose multiprocessors, co-processors, accelerators, DMA engines, and simple or complex devices (collectively "entities"), using a fast scalable interconnect providing both low-latency and high throughput transfers. TileLink is defined in terms of a graph of connected agents that send and receive messages over point-to-point channels within a link to perform operations on a shared address space, where an agent is an active participant that sends and receives messages in order to complete operations, a channel is a one-way communication connection between a master interface (port) and a slave interface carrying messages of homogeneous priority, and a link is a set of channels required to complete operations between two agents. In a pair of connected entities, one entity can include an agent with a master interface and the other entity can include an agent with a slave interface. The agent with the master interface can request the agent with the slave interface to perform memory operations, or request permission to transfer and cache copies of data. The agent with the slave interface manages permissions and access to a range of addresses, wherein it performs memory operations on behalf of requests arriving from the master interface. A request must always receive a response. Consequently, one entity cannot be powered down while the other entity is powered on.

In some implementations, the interconnect system 170 can include a system interconnect system and a control interconnect system. In some implementations, the interconnect system 170 can be a system interconnect system which includes one or more port(s) 172 for interfacing with corresponding ports 151 and 153 in the processor core 120. The integrated circuit 110 includes an interconnect address remapper 174. In some implementations, the interconnect address remapper 174 can be implemented at or with the one or more port(s) 172. Interconnect system 170 requests for both the From Address range (From H) and the To Address range (To [ ]) pass through the interconnect address remapper 174. The interconnect address remapper 174 is placed on the only interconnect system 170 path from any master to both the From [ ] and the To [ ]. The interconnect address remapper 174 can have multiple master input ports, which share the address remap configuration.

The interconnect address remapper 174 provides dynamic translation for one or more remapped regions 180 which are each defined or controlled by a pair of Write-Any Read-Legal (WARL) 64-bit registers, namely, a From [ ] register 182 and a To [ ] register 184, where the From [ ] and To [ ] spaces are both naturally aligned power-of-2 (NAPOT) regions. The From [ ] registers 182 are used to encode the associated range size using a unary encoding in the least-significant bits. The From [ ] and To [ ] registers have a 64-bit space allocated to provide compatibility with <=64-bit physical address space systems. In some implementations, the high bits can be hardwired to zero depending on the physical memory size used in the system. In some implementations, the From [ ] registers 182 and the To [ ] registers 184 can be configured to support legal address values reachable from downstream ports of the interconnect address remapper 174 with a condition that all the From [ ] registers 182 and the To [ ] registers 184 should support the same set of legal address values. Table 1 provides an example of From [ ] and To [ ] encoding.

TABLE 1

| From | To | Description |
| --- | --- | --- |
| xxxxxxx0 | yyyyyyyy | Reserved |
| xx . . . x01 | yy . . . y00 | Map 4 bytes at address xx . . . x00 to yy . . . y00 |
| xx . . . x011 | yy . . . y000 | Map 8 bytes at address xx . . . x000 to yy . . . y000 |
| . . . | | |
| x01 . . . 1 | y0 . . . 0 | Map 2^63 bytes at address x0 . . . 0 to y0 . . . 0 |

In some implementations, each of the one or more remapped regions 180 is programmed such that the size of the region they remap is an integral multiple of XLEN when there are no cache line accesses passed through the interconnect address remapper 174 and is an integral multiple of the cache line size when there are cache line accesses passed through the interconnect address remapper 174. The term XLEN refers to the width of an integer register in bits. In some implementations, XLEN is 32. In some implementations, XLEN is 64.

The interconnect system 170 can ensure that all requests entering the interconnect address remapper 174 are for valid addresses that can support the requested actions. If the From [ ] registers 182 are incorrectly programmed, there will be no match on interconnect system 170 requests. However, the To [ ] registers 184 could be incorrectly programed with addresses that are not reachable from the interconnect address remapper 174 or that cannot support the requested actions. These errors are indicated as dynamic faults in the interconnect system 170 and returned as a denied access to the requester.

In some implementations, From [ ] remapper array entries or From [ ] regions (collectively "From [ ] array entries") can be cached by caches that are inside or internal to the interconnect address remapper 174. For example, these caches can be the L1 instruction cache 150 and the L1 data cache 15. For example, the caches are local to the processor core 120. The remapping operations can occur during cache refills. In some implementations, the interconnect address remapper 174 may not be used to remap addresses that may be cached outside or external to the interconnect address remapper 174 as there is no reverse mapping capability. This could give rise to cache coherence issues. The interconnect address remapper 174 may not be used to remap addresses that map to a memory port. The interconnect address remapper 174 may be used to remap addresses that map to a system port, a peripheral port, or to software visible memories and/or devices that are attached to the interconnect system 170 external to the interconnect address remapper 174. Caches should be flushed after any changes to the remapping addresses. The To [ ] addresses should not be accessed directly by any master if the From [ ] addresses are being cached as this can cause the cache to become incoherent.

The operability, functionality, and/or configuration of the interconnect address remapper 174 is controlled using a set of registers in the register files 140. The set of registers can include, but are not limited to, a configuration register 190, a valid register(s) 191 for each of the remapped regions 180, a flush register 192, an interconnect address remapper version number register 193, number of regions register 194, and a key location register 195 as described herein. I/O fences can be used to ensure that writes to remapper registers, such as configuration register 190, have taken effect before any following memory operations.

In some implementations, the interconnect address remapper 174 can use a remapper memory map to track and/or allocate the memory addresses and the registers used for implementing an instance of an interconnect address remapper configuration. The remapper memory map can include, but is not limited to, an offset value into a memory space, a size of a respective register, contents of a respective register, and a description of the respective register. The From [ ] registers 182 and the To [ ] registers 184 should be readable and writable, with unsupported remapper memory map entries hardwired to zero. Supported remapper memory map entries are allocated contiguously starting from entry 0. At a reset of the system 100, the valid register(s) 191 are cleared, making all remapper memory map entries invalid and disabling remapping. Table 2 shows an example remapper memory map.

tively "remapped") regions, such as the one or more remapped regions 180, where each remapped region can range from 4 bytes (32 bits) up to some maximum power-of-2 bytes in size. In some implementations, the interconnect address remapper 174 can support at least 4-byte translation granularities. In some implementations, the number of regions can be equal to the number of valid registers, such as the valid register(s) 19, that can be tracked or allocated in the remapper memory map. In some implementations, the number of regions can be equal to the size of the memory space allocated to a control port, such as the one or port(s) 170, which would limit the number of the From [ ] registers 182 and the To [ ] registers 184. For example, for a control port size of 0x1000, there can be up to 224 entries ((0x1000–0x200)/16). The same remapper translations are used by all master ports, such as the one or port(s) 170, on the interconnect address remapper 174. In some implementations, the From [ ] registers 182 and the To [ ] registers 184 can be configured to support legal address values reachable from downstream ports of the interconnect address remapper 174 with a condition that all the From [ ] registers 182 and the To [ ] registers 184 should support the same set of legal address values.

In some implementations, the configuration register 190 can be a 32-bit WARL register that controls the current configuration of the interconnect address remapper 174. In some implementations, the configuration register 190 can be initially hardwired with zeros. In some implementations, the configuration register 190 can be encoded with non-zero bits. In some implementations, the configuration register 190 is configurable.

In some implementations, the valid register(s) 191 can be 32-bit WARL registers that holds the valid bits for the remapper memory map entries or the one or more regions 180. For example, a bit i of valid [0] can hold the valid bit for remapper memory map entry i. a bit i of valid [1] can hold the valid bit for remapper memory map entry (32+i), and so on. Valid bits for nonexistent remapper memory map entries are hardwired to zero. The valid register(s) 191 are cleared to zero on a reset of the interconnect address remapper 174. In some implementations, when the flush register 192 is set to 1, the values or valid bits in the valid register(s) 191 are cleared or set to 0.

TABLE 2

| Offset | Size | Contents | Description |
|---|---|---|---|
| 0x000 | 4B | remappercfg | Remapper configuration register |
| 0x004 | 4B | remappervalid[0] | Remapper valid register 0 (valid bit for remapper entries 0-31) |
| 0x008 | 4B | remappervalid[1] | Remapper valid register 1 (valid bit for remapper entries 32-63) |
| ... | | | |
| 0x01c | 4B | remappervalid[6] | Remapper valid register 6 (valid bit for remapper entries 192-223) |
| 0x020 | 1b | remapperflush | Write-only register. Writing a 1 to this register clears all remappervalid bits |
| ... | | | |
| 0x1f4 | 4B | remapperversion | Hardware version of remapper instance |
| 0x1f8 | 4B | remapperentries | Number of entries in remapper instance |
| 0x1fc | 4B | remapperkey | Remapper key location |
| 0x200 | XLEN/8 | From[0] | From address and range size 0 |
| 0x208 | XLEN/8 | To[0] | To address 0 |
| 0x210 | XLEN/8 | From[1] | From address and range size 1 |
| 0x218 | XLEN/8 | To[1] | To address 1 |
| ... | | | |
| 0x200 + 16 * (N-1) | XLEN/8 | From[N-1] | From address and range size N-1 |
| 0x208 + 16 * (N-1) | XLEN/8 | To[N-1] | To address N-1 |

The interconnect address remapper 174 can support a large number of distinct remapped or translation (collec- In some implementations, the interconnect address remapper version number register 193 can be a 32-bit WARL register that identifies the hardware version of the interconnect address remapper 172. A value in the interconnect address remapper version number register 193 can be incremented when a software-visible change is made to the hardware.

In some implementations, the number of regions register 194 (or number of remapper entries in the remapper memory map entry) can be a 32-bit WARL register that indicates the number of remapper entries implemented by a particular instantiation of the interconnect address remapper 174.

In some implementations, the key location register 195 has a one bit state. To prevent spurious updates to the interconnect address remapper 174, all writes to other registers for and/or in the interconnect address remapper 174 are preceded by an unlock operation to the key location register 195, which sets a remapperkey. A defined value is written to the key location register 195 to set the state bit before any write access to any other interconnect address remapper 174 register. The state bit is cleared at reset, and after any write to an interconnect address remapper 174 register. If the remapperkey bit is clear, then all writes to the other interconnect address remapper 174 registers are ignored. Interconnect address remapper 174 registers can be read without setting the remapperkey.

In some implementations, the interconnect address remapper 174 can include a set of registers for interrupt signaling. These set of registers can include, but are not limited to, a read interrupt enable (IE) register 185 for each of the remapped regions 180, a write IE register 186 for each of the remapped regions 180, a read flag 187 for each of the remapped regions 180, and a write flag 188 for each of the remapped regions 180. In some implementations, each of the read IE register 185, the write IE register 186, the read flag 187, and the write flag 188 can be a one bit field.

Each remapped region 180 or interconnect address remapper entry (collectively "remapper entry") can generate an event whenever the From [ ] entry matches on a read or a write access. All matching entries capture the event. The event signals are captured in sticky flags, such as the read flag 187 and the write flag 188, which can be enabled, via the read IE register 185 and/or the write IE register 186, to generate an interrupt. Since the interconnect address remapper 170 sits on the only path to a memory, the interconnect address remapper 170 can implement or process atomic memory operation (AMO) accesses even if only a portion of the atomic word size is being translated. AMOs set both the read and write flags on a match. The enabled flags are OR-ed together to generate a single interrupt signal. If a remapper entry is used just for monitoring, the To [ ] address can be set to be identical to the From [ ] address so as to effectively disable the translation feature for that remapper entry. The interrupt signals can be sent to an interrupt controller 176. If a remapper entry is used for debugging, the To [ ] address can be made illegal so as to generate an interrupt and halt execution close to the matching memory operation.

In some implementations, the interconnect address remapper 174 can include a monitor interface 178. The monitor interface 174 can provide a set of signals which can be used at the system level, such as for example at an external system 179, to monitor the interconnect address remapper 174 activity. The monitor interface 174 can use the interrupt signaling capability and can use the interrupt enable registers as an enable for the monitor interface 174. A remapper entry with its corresponding interrupt enable register set will both generate an interrupt signal to the interrupt controller 176 and appear on the monitor interface 174 when an access matches the remapper entry From [ ] region. A remapper entry with its corresponding interrupt enable register not set will neither generate an interrupt signal nor appear on the monitor interface 174 when an access matches the remapper entry From [ ] region. When it is desired to have a remapper entry appear on the monitor interface 174 but not generate an interrupt signal to the interrupt controller 176, the interrupt enable registers can be set, but a corresponding interrupt enable for the interconnect address remapper 174 in the interrupt controller 176 can be disabled. The monitor interface 174 can provide a remap hit signal, which is an edge level signal which is pulsed when there is a match on the From [ ] and the corresponding Read IE register bit or Write IE register bit is set. The monitor interface 174 can provide a remap hit entry signal, which is an 8-bit signal which indicates the remapper entry that triggered the interconnect address remapper 174 hit.

Operationally, for a transaction or request (collectively "transaction") traversing through the interconnect system 170 via the interconnect address remapper 174, an address portion is compared against the From [ ] remapper array entries. The transaction associated with or related to execution of instructions by the processor core 140 via the pipeline 130. In some implementations, the From [ ] array entries are configured such that only one entry matches on any address, in which case, the corresponding To [ ] value is used as the outgoing address. In some implementations, multiple From [ ] array entries match, then the result address is the bitwise OR of the To [ ] values of all matching From [ ] array entries. Multiple matches are combined to reduce logic critical path. If no valid From [ ] array entry matches, the request is not translated and the transaction proceeds with the original address.

The processor core 120 can perform physical memory attribute (PMA), physical memory protection (PMP), and virtual memory (VM) field checks before sending the transaction into the interconnect system 170. Any errors on the original From [ ] address are reported precisely in the processor execution pipeline 130. In some implementations, the translated To [ ] address might not support the PMA required by the original memory address. In this case, an interconnect system 170 error is reported as an access denied error in the interconnect system 170 response. In some implementations, the To [ ] address is not checked for PMP permissions.

The integrated circuit 110 may provide advantages over conventional processor architectures, such as, for example, providing operational and functional configuration and/or reconfiguration using the interconnect address remapper 174 and facilitating non-intrusive detection of interconnection address remapper 174 matching events. For example, the integrated circuit 110 may implement the technique 200 of FIG. 2.

Figure 2:
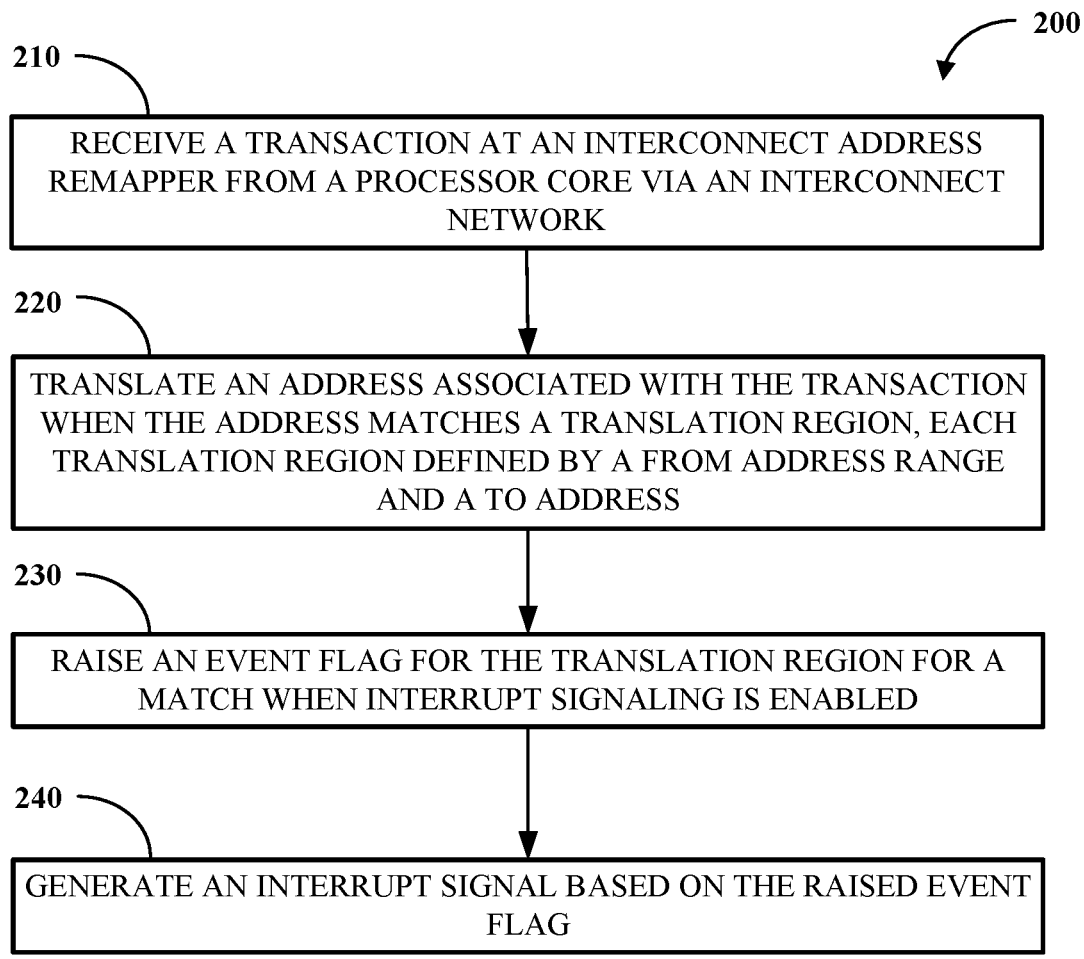
FIG. 2 is flow chart of an example of a technique for address translation using a configurable interconnect address remapper with event detection.

FIG. 2 is flow chart of an example of a technique 200 for address translation using a configurable interconnect address remapper with event detection. The technique 200 includes receiving 210 a transaction at an interconnect address remapper from a processor core via an interconnect network; translating 220 an address associated with the transaction when the address matches a translation region, each translation region defined by a From Address range and a To Address; raising 230 an event flag for the translation region for a match when interrupt signaling is enabled; and generating 240 an interrupt signal based on the raised event flag. The technique 200 may provide advantages over conventional techniques, such as, for example, providing operational and functional configuration and/or reconfiguration and facilitating non-intrusive detection of interconnect address remapper matching events. For example, the technique 200 may be implemented using the integrated circuit 110 of FIG. 1.

As noted, the interconnect address remapper is configurable. Automated generation of integrated circuit designs permits a chip configuration of an application-specific integrated circuit (ASIC) or a system on a chip (SoC) to be specified in terms of design parameters (or colloquially knobs). The design parameters may be captured in an input file, such as a JavaScript Object Notation (JSON) file. A system may automate the operation of tools, such as an integrated circuit design generator (or simply "generator"), that applies the design parameters to generate the integrated circuit design. The generator may express the functional operation of one or more hardware components (e.g., processor cores and caches) in a Hardware Construction Language (HCL) program. Such a program may be executed to produce instance(s) of the one or more components as a register transfer level (RTL) output. Such a program may be capable of producing many different permutations of the one or more components by making allowances for changing the number of and characteristics of elements of the one or more components based on the design parameters. For example, a system may use Chisel, an open source tool for hardware construction embedded in the Scala programming language, to execute a Scala program that applies the design parameters to generate an integrated circuit design in a flexible intermediate representation for register-transfer level (FIRRTL) data structure.

Design parameters may configure the quantity and/or characteristics of hardware components (e.g., processor cores and caches) to be included an integrated circuit design. The design parameters may specify each component to be included. The generator (e.g., the Scala program) may apply the design parameters (e.g., the JSON file) by instantiating the components in the design with an interconnect address remapper that is determined by the generator. The interconnect address remapper may comprise circuitry in the design that is configured to receive a transaction (e.g., read and/or write request(s)) from a source (e.g., a processor core); decode an address associated with the transaction; and translate the transaction based on a translation region match.

It may be desirable to change the interconnect address remapper for a design, such as to optimize the interconnect address remapper for a particular physical design that may be implemented on the chip (e.g., a floor plan). For example, it may be desirable for an interconnect address remapper to have fewer comparators.

Described herein are techniques which permit changing an interconnect address remapper implemented in an integrated circuit design. A system may access a design parameters data structure (e.g., a JSON file) (e.g., a design specification). The design parameters data structure may comprise design parameters (or colloquially knobs) that specify the interconnect address remapper (e.g., interconnect address remapper comprising text, specified as an object in a JSON file, which may further specify hardware connections for components that are attached to the interconnect address remapper) to be included in an integrated circuit (e.g., chip). For example, the number of translation regions and translation region range or size. The interconnect address remapper may be designed to receive and translate a transaction. The system may invoke an integrated circuit design generator (or simply "generator") (e.g., a Scala program) that applies the design parameters data structure (e.g., executes to produce instance(s) of the hardware) to generate the integrated circuit design (e.g., a FIRRTL data structure or an RTL data structure). This may permit optimizing the interconnect address remapper for a particular physical design that may be implemented on a chip.

Additionally, it may be desirable to change the hardware components (e.g., processor cores and caches) that are specified by the design parameters. For example, to implement the hardware in an SoC, it may be desirable to change one or more components to include information that is specific to the SoC, such as addresses associated with registers that are visible in software (e.g., a base address) and/or identifiers associated with the hardware (e.g., a hardware thread (HART) identifier) when implemented on the chip. While the hardware components in the design parameters data structure may be changed individually, there may be many such components specified in the design. This may limit the ability to review and/or modify the design parameters.

Also described herein are techniques which improve changing the hardware components in a design parameters data structure used for a design. A system may access a design parameters data structure (e.g., a JSON file). The design parameters data structure may comprise design parameters (or colloquially knobs) that specify one or more definitions for a hardware object (e.g., an interconnect address remapper, a processor core, a cache, or a cluster, specified as an object in the JSON file) and instances of the hardware object (e.g., instances of the interconnect address remapper, the processor core, the cache, or the cluster, specified as instances of the object in the JSON file). Modifying the one or more definitions for the hardware object in the design parameters data structure may permit modification of the instances of the hardware object (e.g., overriding the instances with the modification to the definition), such as when the generator executes to apply the design parameters data structure. Additionally, values or parameters of individual instances can be modified, such as to include information that is specific to an SoC implementation (e.g., a value that indicates one or more addresses associated with the instance when implemented on the SoC, such as a translation region for translating a memory transaction, and/or a value that indicates an identifier for the instance when implemented on the SoC, such as a central processing unit (CPU) identifier). Thus, the definition and the instances may each be modifiable. The system may invoke the generator that applies the design parameters data structure (e.g., executes to produce the instance(s) of the hardware in the design) to generate the integrated circuit design (e.g., RTL data structure). Thus, hardware in the design parameters data structure may be efficiently changed and implemented in the design.

Figure 3:
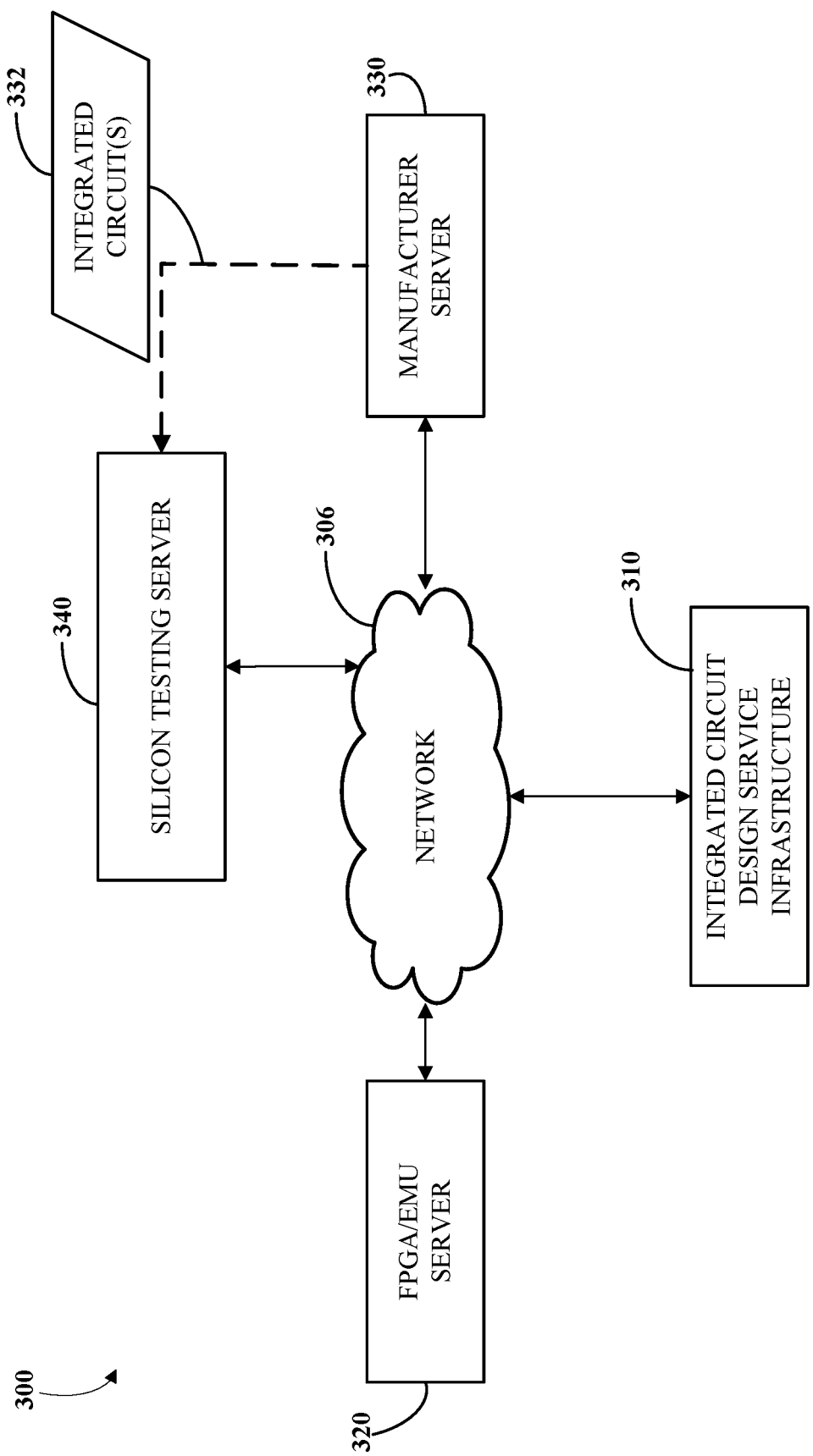
FIG. 3 is a block diagram of an example of a system for facilitating generation and manufacture of integrated circuits.

FIG. 3 is a block diagram of an example of a system 300 for generation and manufacture of integrated circuits having a configurable interconnect address remapper. The system 300 includes a network 306, an integrated circuit design service infrastructure 310, a field programmable gate array (FPGA)/emulator server 320, and a manufacturer server 330. For example, a user may utilize a web client or a scripting application program interface (API) client to command the integrated circuit design service infrastructure 110 to automatically generate an integrated circuit design based on a set of design parameter values selected by the user for one or more template integrated circuit designs. In some implementations, the integrated circuit design service infrastructure 310 may be configured to generate an integrated circuit design with the configurable interconnect address remapper.

The integrated circuit design service infrastructure 310 may include a register-transfer level (RTL) service module configured to generate an RTL data structure for the integrated circuit based on a design parameters data structure. For example, the RTL service module may be implemented as Scala code. For example, the RTL service module may be implemented using Chisel (available at https://people.eecs-.berkeley.edu/Hrb/papers/chisel-dac-2012-corrected.pdf). For example, the RTL service module may be implemented using FIRRTL (flexible intermediate representation for register-transfer level) (available at https://aspire.eecs-.berkeley.edu/wp/wp-content/uploads/2017/11/Specification-for-the-FIRRTL-Language-Izraelevitz.pdf). For example, the RTL service module may be implemented using Diplomacy (available at https://carrv.github.io/2017/papers/cook-diplomacy-carrv2017.pdf). For example, the RTL service module may enable a well-designed chip to be automatically developed from a high level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 310 may invoke (e.g., via network communications over the network 306) testing of the resulting design that is performed by the FPGA/emulation server 320 that is running one or more FPGAs or other types of hardware or software emulators. For example, the integrated circuit design service infrastructure 310 may invoke a test using a field programmable gate array, programmed based on a field programmable gate array emulation data structure, to obtain an emulation result. The field programmable gate array may be operating on the FPGA/emulation server 320, which may be a cloud server. Test results may be returned by the FPGA/emulation server 320 to the integrated circuit design service infrastructure 310 and relayed in a useful format to the user (e.g., via a web client or a scripting API client).

The integrated circuit design service infrastructure 310 may also facilitate the manufacture of integrated circuits using the integrated circuit design in a manufacturing facility associated with the manufacturer server 330. In some implementations, a physical design specification (e.g., a graphic data system (GDS) file, such as a GDSII file) based on a physical design data structure for the integrated circuit is transmitted to the manufacturer server 330 to invoke manufacturing of the integrated circuit (e.g., using manufacturing equipment of the associated manufacturer). For example, the manufacturer server 330 may host a foundry tape-out website that is configured to receive physical design specifications (e.g., such as a GDSII file or an open artwork system interchange standard (OASIS) file) to schedule or otherwise facilitate fabrication of integrated circuits. In some implementations, the integrated circuit design service infrastructure 310 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 310 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 330 may fabricate and/or test integrated circuits based on the integrated circuit design. For example, the associated manufacturer (e.g., a foundry) may perform optical proximity correction (OPC) and similar post-tape-out/pre-production processing, fabricate the integrated circuit(s) 332, update the integrated circuit design service infrastructure 310 (e.g., via communications with a controller or a web application server) periodically or asynchronously on the status of the manufacturing process, perform appropriate testing (e.g., wafer testing), and send to a packaging house for packaging. A packaging house may receive the finished wafers or dice from the manufacturer and test materials and update the integrated circuit design service infrastructure 310 on the status of the packaging and delivery process periodically or asynchronously. In some implementations, status updates may be relayed to the user when the user checks in using the web interface, and/or the controller might email the user that updates are available.

In some implementations, the resulting integrated circuit(s) 332 (e.g., physical chips) are delivered (e.g., via mail) to a silicon testing service provider associated with a silicon testing server 340. In some implementations, the resulting integrated circuit(s) 332 (e.g., physical chips) are installed in a system controlled by the silicon testing server 340 (e.g., a cloud server), making them quickly accessible to be run and tested remotely using network communications to control the operation of the integrated circuit(s) 332. For example, a login to the silicon testing server 340 controlling a manufactured integrated circuit(s) 332 may be sent to the integrated circuit design service infrastructure 310 and relayed to a user (e.g., via a web client). For example, the integrated circuit design service infrastructure 310 may be used to control testing of one or more integrated circuit(s) 332, which may be structured based on a design determined using the process 500 shown in FIG. 5.

Figure 4:
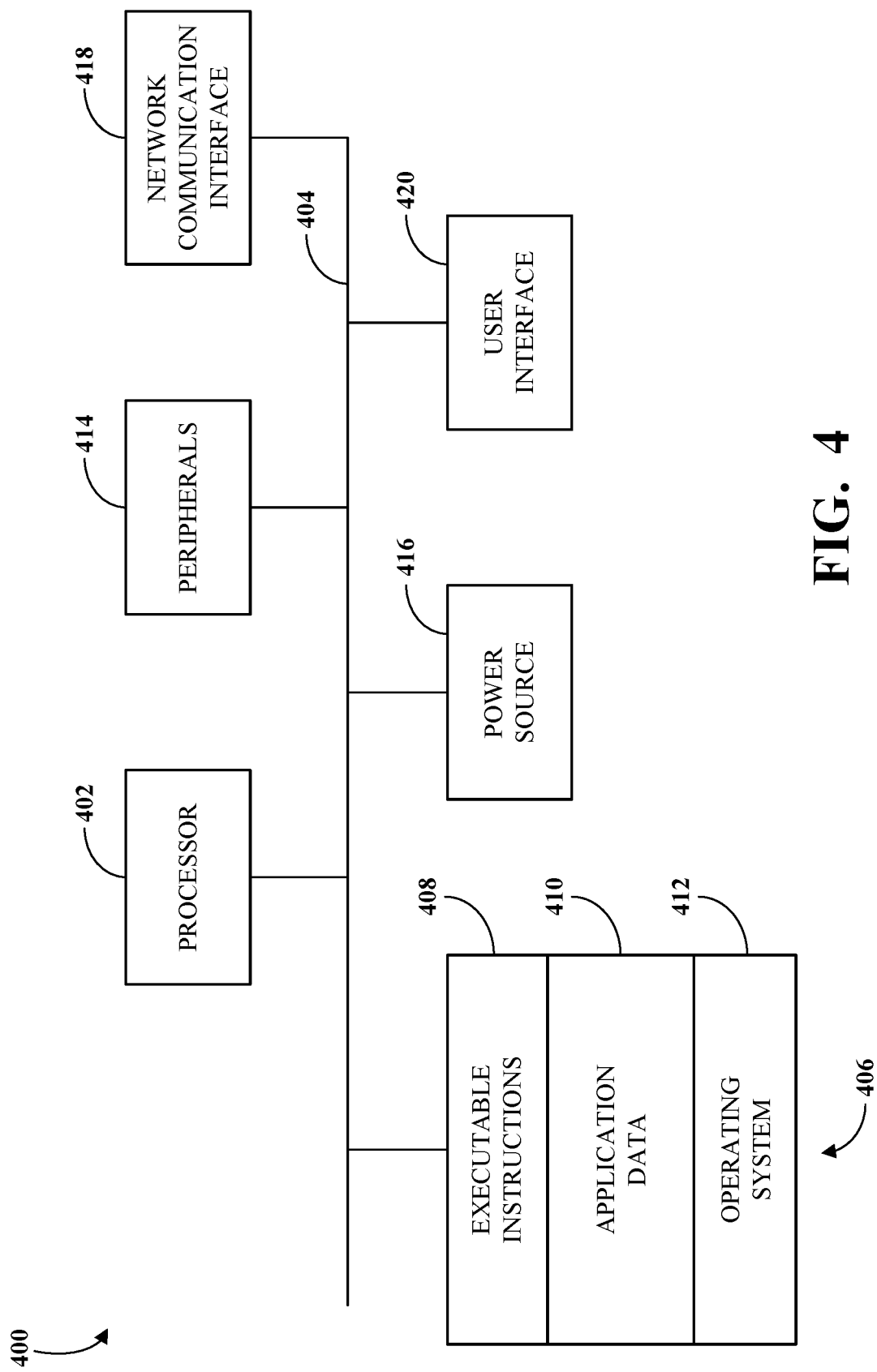
FIG. 4 is a block diagram of an example of a system for facilitating generation of integrated circuits.

FIG. 4 is a block diagram of an example of a system 400 for facilitating generation of integrated circuits having a configurable interconnect address remapper. The system 400 is an example of an internal configuration of a computing device that may be used to implement the integrated circuit design service infrastructure 310. The system 400 can include components or units, such as a processor 402, a bus 404, a memory 406, peripherals 414, a power source 416, a network communication interface 418, a user interface 420, other suitable components, or a combination thereof.

The processor 402 can be a central processing unit (CPU), such as a microprocessor, and can include single or multiple processors having single or multiple processing cores. Alternatively, the processor 402 can include another type of device, or multiple devices, now existing or hereafter developed, capable of manipulating or processing information. For example, the processor 402 can include multiple processors interconnected in any manner, including hardwired or networked, including wirelessly networked. In some implementations, the operations of the processor 402 can be distributed across multiple physical devices or units that can be coupled directly or across a local area or other suitable type of network. In some implementations, the processor 402 can include a cache, or cache memory, for local storage of operating data or instructions.

The memory 406 can include volatile memory, non-volatile memory, or a combination thereof. For example, the memory 406 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 406 can include another type of device, or multiple devices, now existing or hereafter developed, capable of storing data or instructions for processing by the processor 402. The processor 402 can access or manipulate data in the memory 406 via the bus 404. Although shown as a single block in FIG. 4, the memory 406 can be implemented as multiple units. For example, a system 400 can include volatile memory, such as random access memory (RAM), and persistent memory, such as a hard drive or other storage.

The memory 406 can include executable instructions 408, data, such as application data 410, an operating system 412, or a combination thereof, for immediate access by the processor 402. The executable instructions 408 can include, for example, one or more application programs, which can be loaded or copied, in whole or in part, from non-volatile memory to volatile memory to be executed by the processor 402. The executable instructions 408 can be organized into programmable modules or algorithms, functional programs, codes, code segments, or combinations thereof to perform various functions described herein. For example, the executable instructions 408 can include instructions executable by the processor 402 to cause the system 400 to automatically, in response to a command, generate an integrated circuit design and associated test results based on a design parameters data structure. The application data 410 can include, for example, user files, database catalogs or dictionaries, configuration information or functional programs, such as a web browser, a web server, a database server, or a combination thereof. The operating system 412 can be, for example, Microsoft Windows®, macOS®, or Linux®; an operating system for a small device, such as a smartphone or tablet device; or an operating system for a large device, such as a mainframe computer. The memory 406 can comprise one or more devices and can utilize one or more types of storage, such as solid-state or magnetic storage.

The peripherals 414 can be coupled to the processor 402 via the bus 404. The peripherals 414 can be sensors or detectors, or devices containing any number of sensors or detectors, which can monitor the system 400 itself or the environment around the system 400. For example, a system 400 can contain a temperature sensor for measuring temperatures of components of the system 400, such as the processor 402. Other sensors or detectors can be used with the system 400, as can be contemplated. In some implementations, the power source 416 can be a battery, and the system 400 can operate independently of an external power distribution system. Any of the components of the system 400, such as the peripherals 414 or the power source 416, can communicate with the processor 402 via the bus 404.

The network communication interface 418 can also be coupled to the processor 402 via the bus 404. In some implementations, the network communication interface 418 can comprise one or more transceivers. The network communication interface 418 can, for example, provide a connection or link to a network, such as the network 306 shown in FIG. 3, via a network interface, which can be a wired network interface, such as Ethernet, or a wireless network interface. For example, the system 400 can communicate with other devices via the network communication interface 418 and the network interface using one or more network protocols, such as Ethernet, transmission control protocol (TCP), Internet protocol (IP), power line communication (PLC), wireless fidelity (Wi-Fi), infrared, general packet radio service (GPRS), global system for mobile communications (GSM), code division multiple access (CDMA), or other suitable protocols.

A user interface 420 can include a display; a positional input device, such as a mouse, touchpad, touchscreen, or the like; a keyboard; or other suitable human or machine interface devices. The user interface 420 can be coupled to the processor 402 via the bus 404. Other interface devices that permit a user to program or otherwise use the system 400 can be provided in addition to or as an alternative to a display. In some implementations, the user interface 420 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 414. The operations of the processor 402 can be distributed across multiple clients or servers, which can be coupled directly or across a local area or other suitable type of network. The memory 406 can be distributed across multiple clients or servers, such as network-based memory or memory in multiple clients or servers performing the operations of clients or servers. Although depicted here as a single bus, the bus 404 can be composed of multiple buses, which can be connected to one another through various bridges, controllers, or adapters.

Figure 5:
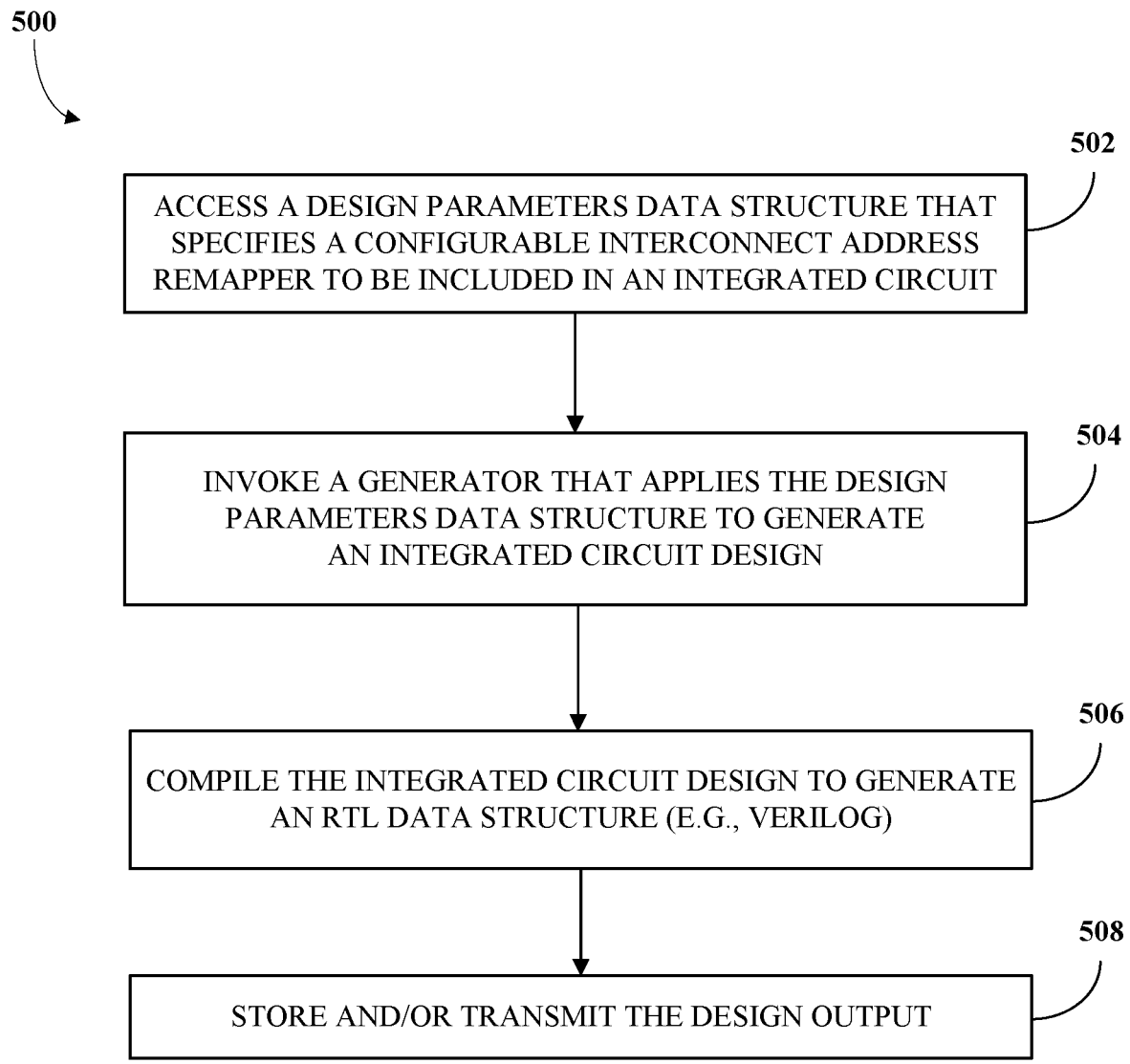
FIG. 5 is a flow chart of an example of a process for facilitating integrated circuit generation with a configurable interconnect address remapper with event detection.

FIG. 5 is a flow chart of an example of a process 500 for facilitating integrated circuit generation with a configurable interconnect address remapper. The process 500 may include accessing 502 a design parameters data structure that specifies a configurable interconnect address remapper comprising text; invoking 504 an integrated circuit design generator that applies the design parameters data structure; compiling 506 the integrated circuit design to generate an RTL data structure such as Verilog; and/or storing and/or transmitting 508 the integrated circuit design. For example, the process 500 may be implemented using the system 300 shown in FIG. 3 and/or the system 400 shown in FIG. 4

The process 500 may include accessing 502 a machine readable design parameters data structure (e.g., a JSON file). In some implementations, a system like the integrated circuit design service infrastructure 310 shown in FIG. 3 may execute to access the design parameters data structure. In some implementations, the system may execute to compose the design parameters data structure. The design parameters data structure may comprise design parameters that specify a configurable interconnect address remapper comprising text (e.g., specified as an object in the JSON file) to be included in an integrated circuit. In some implementations, the configurable interconnect address remapper comprising the text may be selected from a library. The configurable interconnect address remapper comprising the text may be specified as an object having hardware connections. The configurable interconnect address remapper comprising the text may be designed to translate a transaction address (e.g., read and/or write request(s)) from a source (e.g., a processor core).

In some implementations, the design parameters data structure may specify one or more definitions for a hardware object (e.g., the configurable interconnect address remapper) and instances of the hardware object (e.g., instances of the configurable interconnect address remapper). Modifying the one or more definitions for the hardware object in the design parameters data structure may permit modification of the instances (e.g., overriding the instances via the modification to the definition). Additionally, values or parameters of individual instances can be modified, such as to include information that is specific to an SoC implementation (e.g., a value that indicates one or more addresses associated with the instance when implemented on the SoC, such as a translation region for translating a memory transaction, and/or a value that indicates an identifier for the instance when implemented on the SoC, such as a central processing unit (CPU) identifier). Thus, the definition and the instances may each be modifiable.

The process 500 may also include invoking 504 an integrated circuit design generator ("generator") (e.g., a Scala program) that applies the design parameters data structure (e.g., executes to produce instance(s) of the hardware) to generate the integrated circuit design (e.g., a FIRRTL data structure or an RTL data structure). The generator may implement the configurable interconnect address remapper be included in the integrated circuit. This may permit optimizing the configurable interconnect address remapper for a particular physical design that may be implemented (e.g., floor plan). In some implementations, the generator may express a functional operation of the hardware components (e.g., configurable interconnect address remapper, comparators, processor core, cache) in a Hardware Construction Language (HCL) program. For example, the generator may take the design parameters data structure (e.g., the JSON file) as input, execute Chisel to elaborate instances of the hardware components with the configurable interconnect address remapper, and generate the design in a FIRRTL data structure or an RTL data structure. The design may express the integrated circuit design as synthesizable circuitry.

The process 500 may also include compiling 506 the integrated circuit design to generate an RTL data structure such as Verilog. For example, the integrated circuit design may be compiled using a FIRRTL compiler to generate Verilog. The design output may express the integrated circuit design as synthesizable circuitry in Verilog.

The process 500 may also include storing and/or transmitting 508 the RTL data structure compiled from the integrated circuit design. The RTL data structure may be stored for use in subsequent operations, such as synthesis, placement and routing, implementation of clock trees, and/or simulation analysis. Additionally, the RTL data structure may be transmitted for manufacturing of an integrated circuit, such as an ASIC or an SoC.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. An integrated circuit for executing instructions comprising:
    a processor core configured to execute instructions, wherein the processor core includes:
    one or more pair of region registers configured to define a From Address range and a To Address;
    a region register configured to store a number of regions defined in the integrated circuit, wherein a region in defined by a pair of region registers;
    interrupt enable registers dynamically interacting with each of the one or more pair of region registers; and
    event flags associated with each of the one or more pair of region registers, configured to indicate a matching condition for address ranges;
    an interconnection system configured to handle transactions from the processor core related to the execution of the instructions;
    an interconnect address remapper configured to translate an address associated with a transaction using the one or more pair of region registers; and
    an interrupt controller configured to receive an interrupt signal from the interconnect address remapper when the interrupt enable registers are enabled and at least one of the event flags is raised when at least one of the one or more pair of region registers matches the address associated with the transaction.

2. The integrated circuit of claim 1, wherein the processor core further includes:
    a flush register configured to flush valid registers associated with each of the one or more pair of region registers.

3. The integrated circuit of claim 1, wherein for each of the one or more pair of region registers, a size of a region is an integral multiple of integer register width when there are no cache line accesses passed through the interconnect address remapper and is an integral multiple of cache line size when there are cache line accesses passed through the interconnect address remapper.

4. The integrated circuit of claim 1, wherein From Address ranges are cached in caches local to the processor core.

5. The integrated circuit of claim 1, wherein remapping by the interconnect address remapper occurs during a cache refill.

6. The integrated circuit of claim 1, wherein multiple raised event flags are logically OR-ed to-together to generate the interrupt signal.

7. The integrated circuit of claim 1, wherein each event flag includes a read event flag and a write event flag and each interrupt enable register includes a read interrupt enable register and a write interrupt enable register.

8. The integrated circuit of claim 1, wherein a matching atomic memory operation transaction sets a read event flag and a write event flag.

9. The integrated circuit of claim 1, wherein a To Address is set to the From Address range to monitor interconnect address remapper events to disable a translation feature.

10. The integrated circuit of claim 1, wherein a To Address is set to an illegal value to generate an interrupt signal and halt execution proximate to matching transaction.

11. The integrated circuit of claim 1, further comprising:
    a monitor interface configured to provide signals for system level monitoring of the interconnect address remapper when the interrupt enable registers are enabled, wherein the signals include a match signal and a matching region identification signal.

12. A method comprising:
    receiving a transaction associated with a memory operation at an interconnect address remapper from a processor core via an interconnect network;
    translating an address associated with the transaction when the address matches a translation region, each translation region defined by a From Address range and a To Address;
    raising an event flag indicating a matching condition for the translation region for a match when interrupt signaling is enabled; and generating an interrupt signal from an interrupt controller based on the raised event flag.

13. The method of claim 12, further comprising:
flushing a valid register associated with each region upon a reset of the interconnect address remapper.

14. The method of claim 12, wherein for each region, a size of the region is an integral multiple of integer register width when there are no cache line accesses passed through the interconnect address remapper and is an integral multiple of cache line size when there are cache line accesses passed through the interconnect address remapper.

15. The method of claim 12, wherein From Address ranges are cached in caches local to the processor core.

16. The method of claim 12, wherein the translating by the interconnect address remapper occurs during a cache refill.

17. The method of claim 12, further comprising:
logically OR-ing multiple raised event flags to generate the interrupt signal.

18. The method of claim 12, wherein each event flag includes a read event flag and a write event flag and each interrupt enable register includes a read interrupt enable register and a write interrupt enable register.

19. The method of claim 12, wherein a To Address is set to the From Address range to monitor interconnect address remapper events absent translation and wherein a To Address is set to an illegal value to generate an interrupt signal and halt execution proximate to matching transaction.

20. The method of claim 18, further comprising:
raising the read event flag and the write event flag for an atomic memory operation transaction which matches a region; and
providing a match signal and a matching region identification signal for system level monitoring of the interconnect address remapper when the interrupt enable registers are enabled.

* * * * *